United States Patent [19]

Pfau

[11] 4,185,184
[45] Jan. 22, 1980

[54] APPARATUS AND METHOD FOR CONTROLLING THE INTERMITTENT RETRACTION OF THE ELECTRODE TOOL IN AN EDM MACHINE

[75] Inventor: Jean Pfau, Geneva, Switzerland

[73] Assignee: Ateliers des Charmilles S.A., Geneva, Switzerland

[21] Appl. No.: 817,221

[22] Filed: Jul. 20, 1977

[30] Foreign Application Priority Data

Aug. 12, 1976 [CH] Switzerland .................. 10256/76

[51] Int. Cl.² .............................................. B23P 1/08
[52] U.S. Cl. ................................ 219/69 G; 219/69 C
[58] Field of Search .............. 219/69 G, 69 M, 69 V, 219/69 C, 69 R

[56] References Cited

U.S. PATENT DOCUMENTS

| | | | |
|---|---|---|---|
| 3,474,216 | 10/1969 | Morgan | 219/69 G |
| 3,875,374 | 4/1975 | Inoue | 219/69 G |
| 4,004,123 | 1/1977 | Inoue | 219/69 M |
| 4,045,641 | 8/1977 | Ullmann et al. | 219/69 M |
| 4,057,703 | 11/1977 | Pfau | 219/69 M |

Primary Examiner—Bruce A. Reynolds
Assistant Examiner—Clifford C. Shaw
Attorney, Agent, or Firm—Hauke and Patalidis

[57] ABSTRACT

A process and apparatus for controlling the retraction of the electrode tool of an EDM machine such as to maintain the material removal rate to a value approaching the maximum theoretical value. The control system comprises monitoring the machining rate for providing an average value of the material removal rate during at least a time interval corresponding to a single retraction period of the electrode, and varying the frequency of subsequent retractions of the electrode as a function of that average value such as to consistently maintain a material removal rate which is self-adaptive and tends to reach a maximum theoretical value.

8 Claims, 5 Drawing Figures

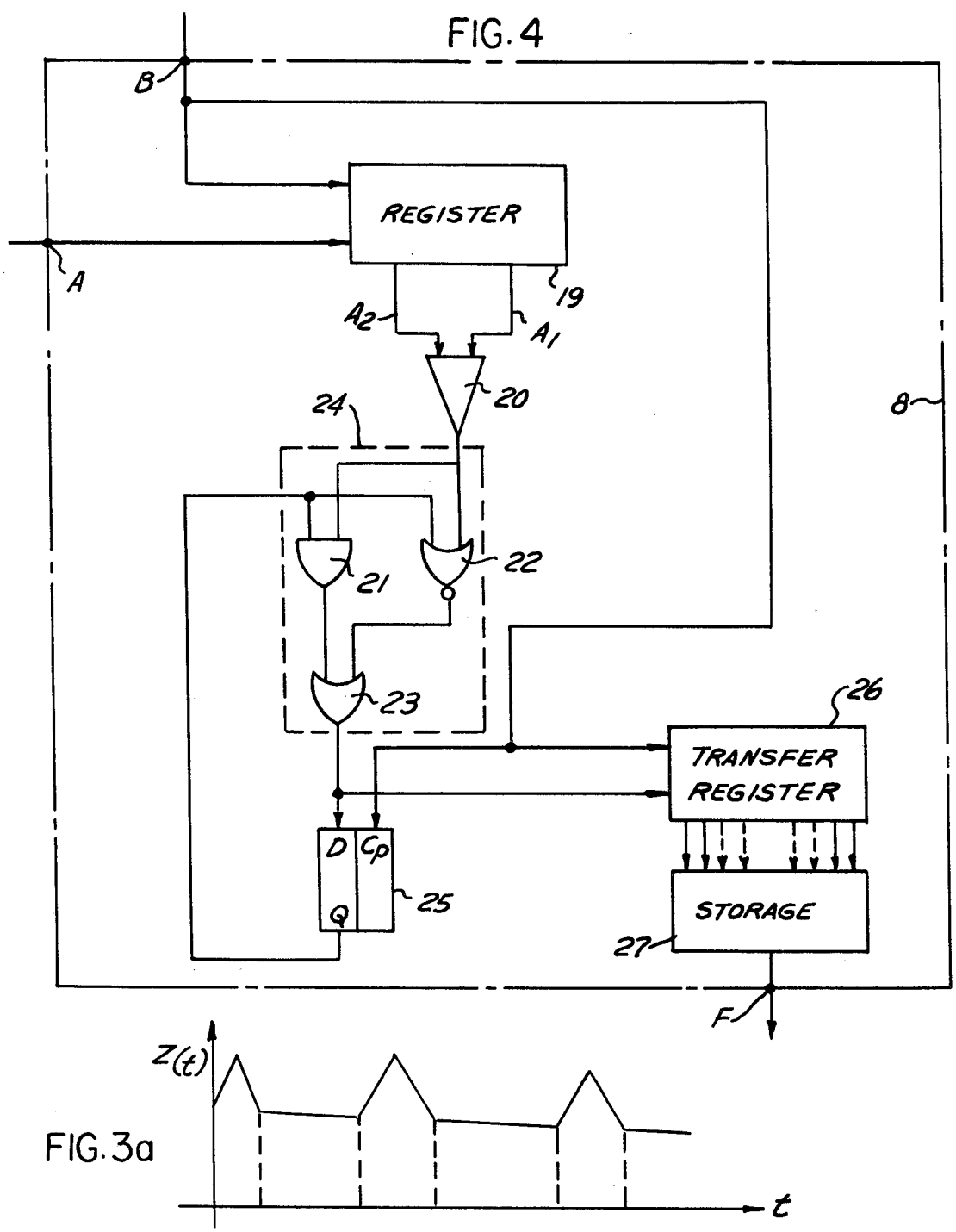

APPARATUS AND METHOD FOR CONTROLLING THE INTERMITTENT RETRACTION OF THE ELECTRODE TOOL IN AN EDM MACHINE

BACKGROUND OF THE INVENTION

The present invention relates to a process and apparatus for machining an electrode workpiece by means of intermittent and electro-erosive electrical discharges occurring between an electrode workpiece and an electrode tool, and more particularly to a method and apparatus whereby the electrodes are retracted relative to each other momentarily and repeatedly, as a function of the machining conditions at the gap between the electrodes.

It is known, in EDM technology, to periodically and repeatedly retract the electrodes, one relative to the other, to facilitate machining under adverse conditions in order to obtain a rapid flushing of the gap by the machining fluid for the purpose of improving the machining conditions. It is known that rapid oscillation of the electrodes is an efficient and simple arrangement for renewing the dielectric fluid in the machining gap. However, no one has been able, until now, to achieve an optimum compromise between the machining time lost during retraction of the electrodes and the shortening of machining time realized by improving the machining rate as a result of forcing the dielectric fluid to flow through the machining zone during retraction of the electrode.

Adaptive controls of the frequency and duration of the electrode intermittent retractions have already been proposed. For example, in the method described in U.S. Pat. No. 3,875,374, the amplitude and the frequency of the electrode retraction are periodically varied as a function of the electrical discharge machining parameters. Such a method, which maintains predetermined machining conditions, does not permit to achieve a maximum machining removal efficiency during each relative retraction of the electrodes.

The present invention results from the discovery that a maximum material removal rate may be achieved by taking into consideration the progressive deterioration of the machining conditions under which the electrical discharge machining is effected in the course of each machining cycle during a single relative retraction of the electrode. This progressive deterioration causes a decrease of the useful machining current, and there is a well-defined ratio between the duration of an electrode retraction and the time interval between two consecutive retractions during which the average useful current, calculated during a single retraction period and, consequently, the average machining rate during the same time interval, is maximum.

The EDM process of the present invention has for its principal object to effectuate the relative retractions of the electrodes at a permanently optimized frequency and duration of the relative retractions. The process of the invention consists principally in measuring a characteristic value of the machining rate, calculating the average value of this parameter during at least one time interval comprising a single retraction period of the electrodes, and varying the frequency of the retractions as a function of that average value, for the purpose of maintaining the machining rate at a maximum value.

The invention relates also to an apparatus for practicing the method of the invention. The apparatus comprises means for retracting the electrodes one relative to the other during a predetermined time interval, means for developing a first electrical magnitude representative of the machining rate as soon as a machining cycle is begun, means for developing a second electrical magnitude representative of the time elapsed from the instant the electrodes are retracted, means for calculating the ratio of the first electrical magnitude to the second electrical magnitude, means for detecting the instant at which this ratio ceases increasing, and means cooperating with the detection means for controlling the next retraction of the electrodes.

SUMMARY OF THE INVENTION

The present invention, consequently, contemplates providing a first adaptive circuit which effectuates consecutive calculations of the average value of the machining rate as soon as the electrodes are retracted and which controls the immediately subsequent retractions as soon as this value no longer increases. In this manner, the quantity of material removed from the workpiece is always maximum during each retraction cycle. In order to insure that the duration of the electrode retractions is of an adequate length for re-establishing normal machining conditions prior to the beginning of a new machining cycle, a second adaptive circuit may be provided which varies the duration of the retractions by consecutive steps, such as to optimize the value of the average material removal rate achieved at the end of each machining cycle.

The many objects and advantages of the present invention will become apparent to those skilled in the art when the following description of the best mode contemplated for practicing the invention is read in conjunction with the accompanying drawing, which represents schematically and for illustrative purposes only an example of apparatus for practicing the invention.

BRIEF DESCRIPTION OF THE DRAWINGS

FIGS. 3a and 3b are curve diagrams useful in explaining the operation of the schematic of FIG. 2; and FIG. 4 is a detailed schematic of another portion of the circuit of FIG. 1.

DETAILED DESCRIPTION OF THE PREFERRED EMBODIMENT

Figure 1:
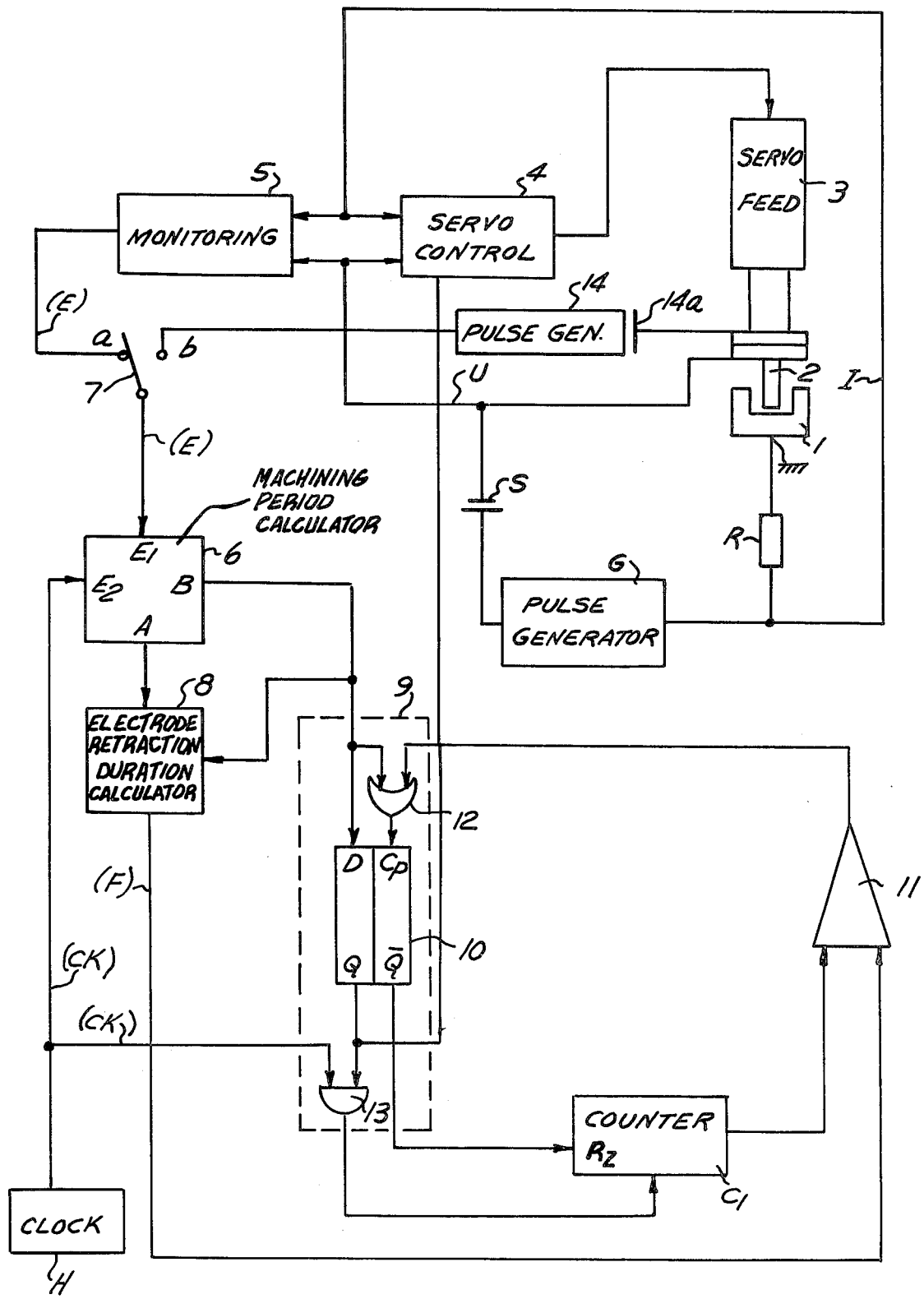
FIG. 1 illustrates a schematic block diagram of an apparatus according to the present invention.

Referring now to the drawing, FIG. 1 illustrates an apparatus comprising an electrode workpiece 1 and an electrode tool 2 whose relative displacement is controlled by a servo-feed mechanism 3 according to a command signal supplied by a servo-control circuit 4. The EDM machining current is supplied by a DC voltage source S having a terminal connected to the electrode tool 2 and its other terminal connected through a pulse generator G and a resistor R, which measures the machining current to the electrode workpiece 1. Such an arrangement of elements is conventional and well-known in the art.

Monitoring signals representing respectively the machining current and the machining voltage are applied by lines I and U, respectively, to the servo-control circuit 4, and simultaneously to a monitoring circuit 5 which provides at its output a pulse in a line E, each time an effective electrical discharge occurs across the gap between the electrodes 1 and 2. The pulses at the output of the monitoring circuit 5 are supplied to an input $E_1$ of a circuit 6 when the double-pole switch 7 is in the position a. The circuit 6 calculates the duration of a machining period, and receives on a second input $E_2$ timing pulses CK obtained from a clock H.

The circuit 6 has a first output A which is connected to a calculator circuit 8 which calculates the duration of relative electrode retraction, the signal appearing at the output A of the circuit 6 being proportional to the average value of the machining rate calculated by the circuit 6. The second output of the circuit 6, output B, supplies a command signal for the relative retraction of the electrodes at the end of a machining cycle. The output B is connected to a second input of the circuit 8 and also to a blocking circuit 9.

The blocking circuit 9 comprises a flip-flop 10 having an input D connected to the output B of the circuit 6. The control input CP of the flip-flop 10 is connected to both the output B of the circuit 6 and the output of a comparator 11 through an OR gate 12. The output Q of the flip-flop 10 is connected to the servo-control circuit 4 and also to one of the inputs of an AND gate 13. The other input of the AND gate 13 receives timing pulses CK from the clock H. The output of the AND gate 13 is connected to a counter $C_1$ having a reset input $R_Z$ which is connected to the output $\overline{Q}$ of the flip-flop 10. The output of the circuit 8 is connected to one of the inputs of the comparator 11, the other input of the comparator 11 being connected to the output of the counter $C_1$.

When the double-pole switch 7 is in the position b, the circuit 6 is connected to a pulse generator 14, having a movable control element $14_a$ mechanically connected to the holder of the electrode tool 2, such that the pulse generator 14 supplies a signal having a frequency proportional to the electrode feed.

Figure 2:
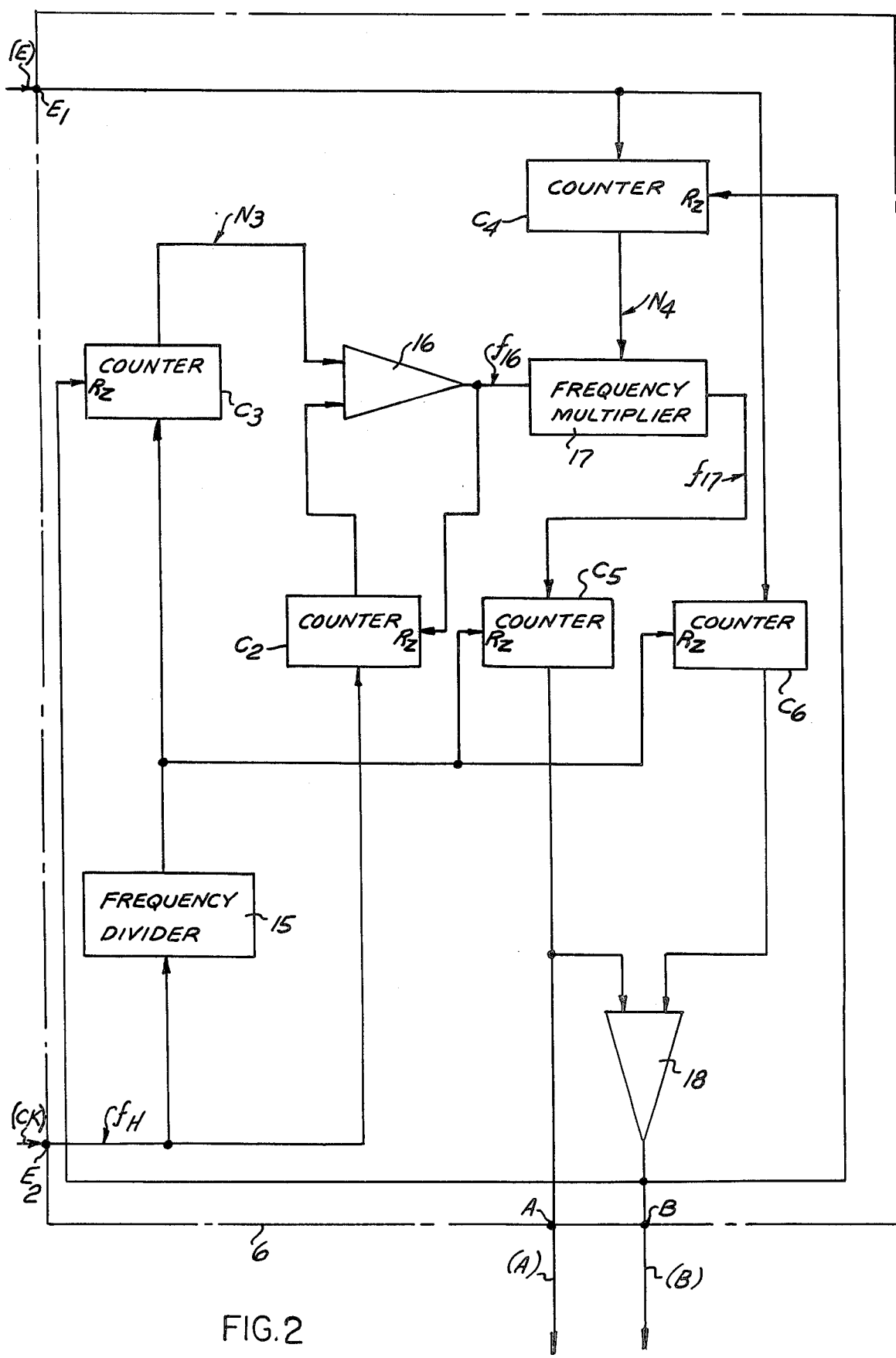
FIG. 2 is a detailed schematic of a portion of the circuit of FIG. 1.

FIG. 2 is a detailed schematic of the circuit 6. The circuit input $E_2$, which receives incoming timing pulses CK from the clock H, FIG. 1, is connected through a first line to a frequency divider 15 and through a second line to a counter $C_2$. The output of the frequency divider 15 is connected to a counter $C_3$. The counts in the two counters $C_2$ and $C_3$ are compared by a comparator 16. The output of the comparator 16 is connected to the input of a frequency multiplier 17 and to the reset input $R_Z$ of the counter $C_2$. The multiplicand of the frequency multiplier 17 is a variable number $N_4$ which is the real time count in a counter $C_4$ which counts the pulses (E) applied to the input $E_1$ of the circuit 6 from the output of the monitoring circuit 5 or, alternatively according to the position of the switch 7, from the pulse generator 14 of FIG. 1, the frequency of the pulses (E) corresponding to the machining rate. A counter $C_6$, FIG. 2, also receives as its input the pulses (E) from the input $E_1$ of the circuit 6.

The output of the frequency multiplier 17 is connected to the input of a counter $C_5$ whose count is compared in a comparator 18 to the count in the counter $C_6$. The output of the comparator 18 is connected to the output B of the circuit 6, and is also connected to the reset inputs $R_Z$ of both counters $C_3$ and $C_4$. The output of the counter $C_5$ is also connected to the terminal A of the circuit 6 which in turn, as is shown at FIG. 1, is connected to an input of the calculator circuit 8.

FIG. 4 illustrates a detailed circuit schematic of the calculator circuit 8 of FIG. 1. The terminal B of the circuit 8, which is connected to the output of the comparator 18 of FIG. 2, is connected on one hand to the transfer-control input of a dual-entry register 19 and, on the other hand, to both a transfer register 26 and the input $C_p$ of a flip-flop 25. The terminal A of the circuit 8, which is connected to the output of the counter $C_5$ of FIG. 2, is connected to the transfer input of the dual-entry register 19. The dual-entry register 19 is a dual shift register, and the numbers held in the register 19 are continuously compared by a comparator 20.

The output of the comparator 20 is connected to one of the inputs of a circuit 24 which accomplishes the function of an inverted exclusive-OR gate, such a circuit consisting of an AND gate 21, of a NOR gate 22, and of an OR gate 23. The output of the circuit 24 is connected to the input D of the flip-flop 25 and to the transfer-control input of the shift register 26. The output Q of the flip-flop 25 is connected to the second input of the circuit 24, i.e., to one of the inputs of the AND gate 21. The outputs of the transfer register 26 are connected to a memory or storage 27.

The operation of the apparatus of the invention is as follows:

The consecutive electrical discharges occurring in the machining zone between the electrodes 1 and 2, of FIG. 1, which are obtained by means of the pulse generator G and the DC source S, have a voltage value V and a current I which are applied to the input of the monitoring circuit 5 which provides at its output a pulse for every electro-erosive, or effective, electrical pulse across the machining zone. The monitoring circuit 5 is well-known in the art and operates as described, for example, in application Ser. No. 670,053, filed Mar. 24, 1976, now U.S. Pat. No. 4,090,961. The pulses at the output of the monitoring circuit 5 are counted by the counters $C_4$ and $C_6$ forming part of the circuit 6, FIG. 2, when the double-pole switch 7 of FIG. 1 is in the position a. The instantaneous, or real time, count in the counter $C_4$, FIG. 2, supplies the multiplicand $N_4$ to the frequency multiplier 17, the count in the counter $C_4$ being representative of the material removed from the workpiece from the moment the count is begun, that is as soon as a command signal for the electrode retraction is obtained.

The counts in both counters $C_2$ and $C_3$ are constantly compared and each time they are equal, the counter $C_2$ is reset to zero, such that the frequency of the pulses at the output of the comparator 16 is substantially equal to the frequency fH of the clock pulses CK divided by the count $N_3$ at the output of the counter $C_3$. This frequency of the pulses at the output of the comparator 16, or $f_{16} = fH/N_3$, is inversely proportional to the time counted from the beginning of a retraction cycle, $N_3$ being proportional to that time. The frequency $f_{16}$ is subsequently modified by means of the frequency multiplier circuit 17. The frequency $f_{17}$ of the pulses at the output of the frequency multiplier circuit 17 is proportional to the quantity $N_4$ of material removed from the workpiece. The frequency multiplier circuit 17 is set with a multiplying factor such that the ratio between the frequency $f_{16}$ and the frequency $f_{17}$ is equal to the frequency of the input signal of the counter $C_3$.

In this manner, the number of pulses supplied at the output of the frequency multiplier circuit 17 during a single period of count of the counter $C_3$ represents the average machining rate during such a period. Those pulses are counted by the counter $C_5$ which is reset to zero by each pulse applied to the counter $C_3$. The count (A) of the counter $C_5$ at the end of each counting period represents the average machining rate during that period, such that if the machining rate is constant, the value (A) tends toward a predetermined magnitude, and if the rate progressively decreases, the number (A) also decreases. Therefore, it is necessary to determine the instant at which this magnitude, which represents the average machining rate, ceases increasing for effectively controlling the retraction of the electrodes, the machining rate tending to rapidly deteriorate thereafter. Such a precise instant is determined by the comparator 18 which supplies a signal (B) when the counts in the two counters $C_5$ and $C_6$ are equal, that is, when the magnitude representative of the average machining rate becomes equal to the magnitude representative of the number of effective electrical discharges during a counting interval of the counter $C_6$. The signal (B) controlling the retraction of the electrodes resets to zero the counters $C_3$ and $C_4$.

The counter $C_3$ resumes immediately its counting, while the counter $C_4$ resumes its counting only when effective machining takes place.

FIG. 3a illustrates, as a function of time t, the relative position Z(t) of the electrodes.

FIG. 3b illustrates the variation, as a function of time t, of the magnitude $N_4$ representative of the quantity of material removed from the workpiece and the variation of the average material removal rate $N_4/t$ from the instant the electrodes are retracted.

At time $t_0$, the electrode 2 is retracted and at time $t_1$ machining is resumed. Starting at time $t_1$, the magnitude $N_4$ increases according to a curve having a slope progressively decreasing because of the progressive deterioration of the machining conditions. The average machining rate, calculated from the time $t_0$, increases from time $t_1$ to reach a maximum when the slope of the curve $N_4(t)$ is equal to $$\frac{N_4(t_2)}{t_2 - t_0}.$$

It is at the time $t_2$ that a control signal for retracting the electrode is again given.

As the measuring time interval is given for the period of the signal provided by the divider 15, the average machining rate becomes maximum when the ratio $N_4/t$, which corresponds to the count in the counter $C_5$, after each measuring interval is equal to the variation of $N_4$ during the same interval, such a variation being counted by the counter $C_6$.

The value (A) of the average machining rate is stored in the dual-entry register 19 of the circuit 8, the pulse controlling the storage being the pulse (B) controlling the retraction of the electrode, which further controls the transfer of the value of the average machining rate in the immediately preceding counting period. The two values obtained at the end of two consecutive periods, hereinafter designated as $A_1$ and $A_2$, are compared in the comparator 20 which supplies at its output a logical low level if the value $A_1$ is greater than the value $A_2$, and a logical high level if the value $A_1$ is smaller or equal to the value $A_2$. In the first case, the parameters correspond to a decrease of the average machining rate and, in the second case, they correspond to an increase, or a constancy, of the average machining rate. The output of the comparator 20 therefore provides the algebraic sign of the difference between two consecutive values of the average machining rate.

If the machining rate decreases, the duration of the electrode retraction must be decreased, but if, during the immediately preceding period, the command signal decreasing the duration of the retraction has already been supplied, the duration of the retraction must be increased. In order to respond to such a requirement, the direction of variation of the duration of retraction is stored at the output Q of the flip-flop 25 for comparison in the circuit 24, in the course of the next retraction, with the resulting signal supplied at the output of the comparator 20. The circuit 24 provides at its output a logical high level when its two inputs are of equal level, i.e., when an increase of the duration of retraction has caused an increase in machining rate, or when a decrease of the duration of retraction has caused a decrease of the machining rate. The signal at the output of the circuit 24 thus controls an increase of the duration of retraction.

When the two inputs of the circuit 24 have different levels, i.e., when an increase of the duration of retraction has caused a decrease of machining rate, or, in the alternative, when a decrease of the duration of retraction has caused an increase of machining rate, the signal at the output of the circuit 24 commands a decrease of the duration of retraction. As previously mentioned, such a signal is memorized at the output Q of the flip-flop 25. This signal controls the direction of transfer in the register 26, the transfer being controlled by the pulse (B) of command of retraction. The register 26 has different outputs on which appear the value (F) representative of the duration of retraction of the electrode after a machining period. This value (F) is stored in a memory or buffer circuit 27 and is applied to one of the inputs of the comparator 11. The pulse (B) controlling the retraction of the electrode is applied simultaneously to the inputs D and CP of the flip-flop 10, such that the output Q of the flip-flop is brought to a logical level "1" and the clock pulses CK pass through the AND gate 13 and are counted by the counter $C_1$. When the count in the counter $C_1$ reaches the value (F), which corresponds to the duration calculated by the circuit 8, the comparator 11 provides a pulse into the circuit 9 which switches the output Q of the flip-flop 10 to a logical level "0" and inhibits again the AND gate 13. Simultaneously, the output $\overline{Q}$ of the flip-flop resets the counter $C_1$ to zero. As long as the output Q is at the logical level "1," the circuit 4 controlling the retraction of the electrode is activated and the electrode 2 is retracted. When the output Q is switched to "0," the retraction stops and machining is resumed.

An alternate method for determining the appropriate instant for the retraction of the electrodes consists in storing the counts of the counter $C_5$ in a transfer register in the course of two consecutive pulses provided by the divider 15, and comparing to each other the values thus stored. As soon as the difference between the two values becomes zero or is negative, a pulse (B) for controlling the retraction of the electrode is provided at the output of the comparator 18.

The novel process of the invention presents the advantages of being automatically adaptive to the geometry of the electrode tool. It automatically provides low frequency pulses, with retractions of long duration, for electrodes having a substantial length and a relatively small face area, and pulses at a higher frequency, resulting in retractions of much shorter duratior as compared with relatively short electrodes having a relatively large face area.

Having thus described the present invention by way of a practical embodiment thereof, modifications whereof will be apparent to those skilled in the art, what is claimed as new is as follows:

1. An apparatus for machining an electrode workpiece by means of intermittent electrical discharges occurring between said electrode workpiece and an electrode tool, wherein periodic retractions of said electrodes one relative to the other are effected as a function of existing machining conditions, said apparatus comprising means for relatively retracting said electrodes during a predetermined time interval, means for developing a first electrical magnitude representative of the machining rate from the instant a machining cycle is started, means for developing a second electrical magnitude representative of the time elapsed from the instant said electrodes are retracted, means for calculating the ratio of said first and second electrical magnitudes, means for detecting the instant when said ratio ceases increasing, and means cooperating with said detection means for controlling the next electrode retraction.

2. The apparatus of claim 1 further comprising means for detecting from the pulses applied across the electrodes the pulses resulting in effective electrical discharges, means for counting the number of said detected electrical discharges from the instant a machining cycle begins, and means for giving to said first electrical magnitude a value proportional to said number.

3. The apparatus of claim 1 comprising means for providing a pulse signal at a frequency proportional to the speed at which the electrodes are approached relative to each other, means counting the number of pulses in said signal from the instant corresponding to the beginning of the machining cycle, and means for providing said first electrical magnitude with a value proportional to said number.

4. The apparatus of claim 1 wherein means are provided for calculating at consecutive instants the ratio between the number of effective electrical discharges counted from the instant corresponding to the beginning of electrode retraction to the time elapsed from said instant.

5. The apparatus of claim 4 wherein means are provided for counting the number of effective electrical discharges occurring during a time interval between said successive instants, means for comparing said number with said ratio, and means for controlling the subsequent electrode retraction as soon as said ratio is substantially equal to said number.

6. The apparatus of claim 4 wherein means are provided for storing the value of said ratio calculated during two consecutive instants, means are provided for comparing said values, and means are provided for controlling the subsequent retraction of said electrodes as soon as said values are substantially equal.

7. The apparatus of claim 1 wherein means are provided for varying by successive steps the duration of said electrode retraction after each machining cycle, means are provided for detecting the sign of the difference between two successive values of retraction duration, means are provided for detecting the sign of the difference between two consecutive values of the average material removal rate calculated at the end of two consecutive machining cycles, and means are provided for increasing the duration of said retraction when said differences have the same sign.

8. The apparatus of claim 1 wherein means are provided for varying by consecutive steps the duration of said electrode retraction after each machining cycle, means are provided for detecting the sign of the difference between two consecutive values of the duration of said retraction, means are provided for detecting the sign of the difference between two consecutive values of the average machining rate calculated at the end of two consecutive machining cycles, and means are provided for decreasing the duration of said electrode retraction when said differences have different signs.

* * * * *

UNITED STATES PATENT AND TRADEMARK OFFICE
CERTIFICATE OF CORRECTION

PATENT NO. : 4,185,184
DATED : January 22, 1980
INVENTOR(S) : Jean Pfau

It is certified that error appears in the above-identified patent and that said Letters Patent are hereby corrected as shown below:

Col. 3, line 4, change "a" to --$\underline{a}$--.

Col. 4, line 37, change "a" to --$\underline{a}$--.

Col. 5, line 22, change "t" to --$\underline{t}$--.

Col. 5, line 25, change "t" to --$\underline{t}$--.

Signed and Sealed this

Sixth Day of May 1980

[SEAL]

Attest:

SIDNEY A. DIAMOND

Attesting Officer

Commissioner of Patents and Trademarks